June 13, 1961    R. E. SPENCE    2,987,897
RELEASABLE SNAP RING CONNECTION
Filed Sept. 8, 1959
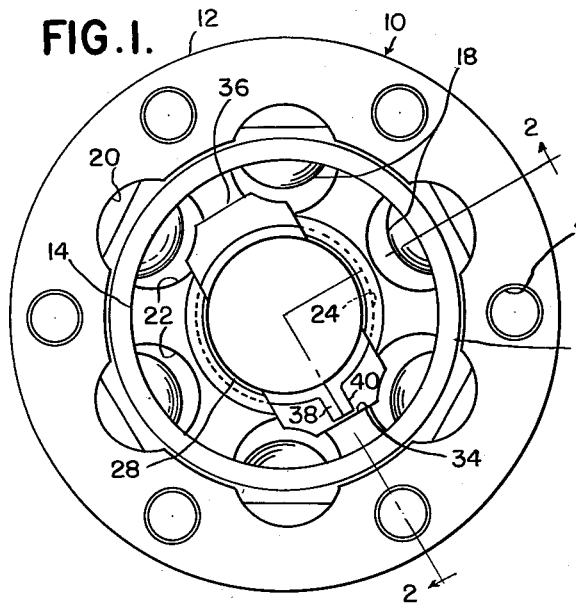
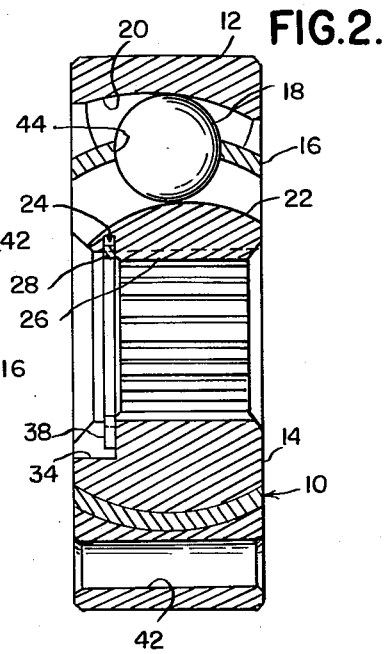
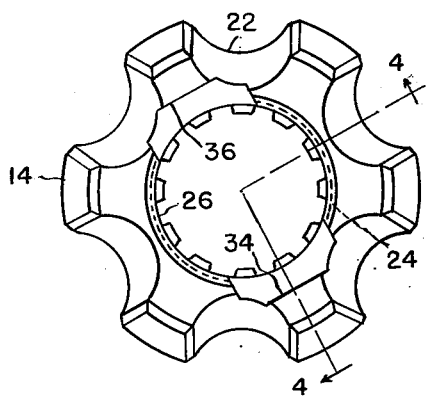
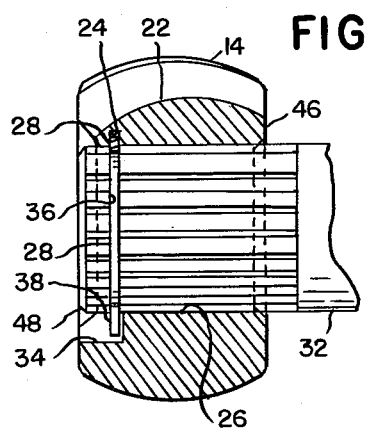
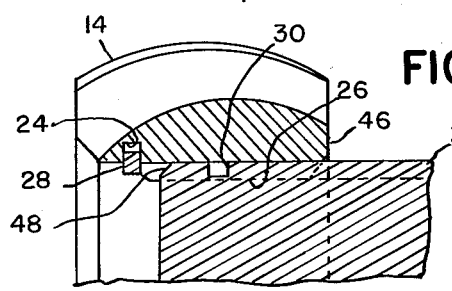
INVENTOR.
ROBERT E. SPENCE
BY Whittemore
Hulbert & Belknap
ATTORNEYS ated June 13, 1961

2,987,897
RELEASABLE SNAP RING CONNECTION
Robert E. Spence, St. Clair Shores, Mich., assignor to Dana Corporation, Toledo, Ohio, a corporation of Virginia
Filed Sept. 8, 1959, Ser. No. 838,603
5 Claims. (Cl. 64—21)

The present invention relates to connecting means and refers more particularly to an improved snap ring connection between a recessed member and a shaft received therein.

In the past it has been known to provide a snap ring acting in conjunction with an annular groove on the splined interior of an annular inner ball race of a universal joint and a similar groove in a splined shaft received in said inner ball race which aligns with the groove in the inner ball race when the shaft and inner ball race are in assembly to secure the shaft and ball race against relative axial movement. With prior constructions however special tools have been necessary to effect the flexing of the snap ring and the disconnecting of the shaft and inner ball race. Also, such connections have in the past been largely internal with the result that maintenance and repair workmen not familiar with the particular connection experience difficulty in determining the best method of disassembly of the shaft and inner ball race.

Therefore it is a purpose of the invention is to provide a snap ring connection between an annular member and a shaft inserted therein which connection is sufficiently visible so that the method of disconnection of the annular member and shaft may be determined by inspection.

Another purpose is to provide a snap ring connection between an annular member and a shaft inserted therein which connection may be removed without the use of special tools.

More specifically it is a purpose to provide a snap ring acting in conjunction with a groove on the inner splined surface of an inner annular ball race of a ball joint and a groove on the outer splined surface of a shaft received within the inner ball race to connect the shaft and inner ball race, the inner ball race being cut away to disclose the nature of the snap ring connection and to provide access thereto to permit disconnecting of the ball race and shaft without the use of special tools.

A further object is to provide an improved snap ring connection between an annular member and a shaft inserted therein which connection is uncomplicated in structure, economical to manufacture and efficient in use.

These and other objects and features of the invention will become apparent as the description proceeds, especially when taken in conjunction with the accompanying drawings, illustrating a preferred embodiment of the invention, wherein:

FIGURE 1 is an end elevation view of a universal joint including an annular inner ball race having a snap ring according to the invention assembled therewith, said inner ball race including means to allow visual inspection of the snap ring and to permit flexing thereof without the use of special tools.

FIGURE 2 is a cross sectional view of the universal joint and snap ring shown in FIGURE 1 taken along the line 2—2 in FIGURE 1.

FIGURE 3 is an end elevation view of the inner ball race of the universal joint shown in FIGURE 1.

FIGURE 4 is a cross-sectional view of the inner ball race shown in FIGURE 3 taken along line 4—4 in FIGURE 3 and showing a shaft received therein and held against axial movement with relation thereto by a snap ring according to the invention.

FIGURE 5 is an enlarged sectional view similar to a portion of FIGURE 4 illustrating the relation between the shaft and snap ring as the shaft is inserted in the ball race.

With particular reference to the figures one embodiment of the present invention will now be described.

In FIGURE 1 there is shown a conventional universal joint generally indicated 10 comprising an outer ball race 12, an inner ball race 14, a cage 16 positioned between the outer and inner ball races and the ball member 18 held within grooves 20 and 22 in the outer and inner ball races respectively by means of the cage 16. An annular groove 24 is provided on the interior splined surface 26 of the inner ball race 14. A snap ring 28 shaped as shown in FIGURE 1 is positioned in the groove 24 and is operable in conjunction therewith and with a similar groove 30 on the end of a splined shaft 32 which is adapted to be received in the annular inner ball race 14 to prevent relative axial movement between the shaft 32 and inner ball race 14. Also, in accordance with the invention a pair of recesses 34 and 36 are provided on opposite sides of one end of the opening in the inner ball race 14 which extend axially with respect to the inner ball race to expose a portion of the snap ring 28 as shown in FIGURE 2. Thus the snap ring 28 and particularly the radially extending end portions 38 and 40 thereof are exposed to view so that a mechanic may readily determine by inspection the manner in which the inner ball race 14 and shaft 32 are connected and so that the ball race and shaft may be readily disconnected without the use of special tools.

More particularly the outer ball race 12 of the universal joint 10 as shown includes the angularly spaced openings 42 around the periphery thereof extending therethrough through which bolts (not shown) may be inserted to secure the outer ball race 12 to a rotating member or a member which it is desired to rotate. The outer ball race 12 further includes the annularly spaced axially extending ball grooves 20 on the radially inner face thereof adapted to receive the balls 18 and to guide them during operation of the universal joint. The ball cage 16 as illustrated is an annular member having sides radially converging axially outwardly from the center thereof. The cage 16 is provided with a plurality of angularly spaced circular openings 44 therein spaced to register with the angularly spaced grooves 20 and 22 in the outer and inner ball races. As will be understood the ball cage 16 is held between the outer and inner ball races 12 and 14 respectively in the areas between the circular openings 44 as shown in FIGURE 2. The ball cage serves to retain the balls 18 within the universal joint 10. The inner ball race 14, as shown best in FIGURES 3 and 4, includes the angularly spaced grooves in the radial outer surface thereof to receive and guide the balls 18 during operation of the universal joint. The inner surface 26 of the inner ball race is splined as illustrated best in FIGURE 3. An annular groove 24 is also provided in the inner surface of the inner ball race 14 to receive a snap ring 28 in position to secure the splined shaft 32 within the inner ball race as shown in FIGURE 4.

According to the invention the snap ring 28 is transversely split and formed of a flexible resilient material in the shape shown best in FIGURE 1 wherein integral radially outwardly extending abutting portions 38 and 40 are provided at the ends thereof. In conjunction with snap ring 28, the inner ball race 14 is provided with the recesses 34 and 36 in one end thereof shaped as shown and extending axially of the inner ball race from the outer surface thereof to the depth of the annular groove 24 in the inner surface 26. The recesses 34 and 36 make it possible for a mechanic who finds it necessary to disassemble the universal joint to readily determine the method by which the shaft 32 and inner ball race 14 are connected by visual inspection. Also the recess 34 in conjunction with the radially extending portions 38 and 40 on the snap ring 28 permits disconnecting of the shaft 32 and the inner ball race 14 by a mechanic without the use of special tools by the expedient of placing a screw driver between the portions 38 and 40 of the snap ring and twisting the screw driver to flex the snap ring out of the groove 30 in the shaft 32. The recess 36 while it aids in the determination of the type of connection between the shaft 22 and inner ball race 14 is also provided to balance the inner ball race 14 during operation of the universal joints. Obviously, the snap ring may be reversed 180° so that the ends 38 and 40 lie in recess 36.

In assembly of an inner ball race 14 and a shaft 32 a snap ring 28 having in the unflexed condition thereof an outer diameter which is greater than the inner diameter of the groove 24 in the inner surface 26 of the inner ball race 14 and an inner diameter which is less than the outer diameter of the groove 30 in the shaft 32 is flexed into place within the groove 24 as shown in FIGURE 5. The shaft 32 is then inserted within the inner ball race 14 from the end 46 thereof and is advanced toward the snap ring 28. The shaft 32 is provided with a beveled surface 48 on the end thereof which on contact with the snap ring 28 is operable to flex the snap ring 28 radially outwardly into the groove 24. If desired a screw driver or similar tool inserted between the portions 38 and 40 of the snap ring may be used to help flex the snap ring. On further insertion of the shaft 32 the groove 30 on the shaft and the groove 24 and snap ring 28 become aligned whereupon the snap ring 28 contracts radially so that a portion thereof is within the groove 30 in the shaft 32 locking shaft 32 and the inner ball race 14 against further relative axial movement. When it is desired to disconnect the shaft from the inner ball race 14 as above indicated it will be evident from inspection of the shaft and inner ball race in their connected relation that the connection therebetween may be severed by inserting a usual tool of a mechanic such as a screw driver between the portions 38 and 40 of the snap ring 28 and twisting the screw driver whereupon the snap ring 28 is flexed radially outwardly into the groove 24 and out of the groove 30 to allow withdrawal of the shaft 22 from the inner ball race 14.

Thus applicant has provided a means for connecting a splined shaft to the splined inner surface of an annular member which is simple in construction, the operation of which is readily apparent from an inspection of the connection and which connection may be removed without the use of special tools.

What I claim as my invention is:

1. A member having an opening therein, a shaft member received in said opening, a first circumferentially extending external groove in said shaft member and a second circumferentially extending internal groove in said opening registering with said external groove, a flexible transversely split snap ring in said second groove and projecting partly into said first groove to prevent relative axial movement between said members, said snap ring being adapted to be flexed from said first groove farther into said second groove to permit disengagement of said members, a recess in one of said members exposing the split in said snap ring to visual inspection, the portions of said snap ring adjacent said split therein extending into said recess and engageable with radially opposite walls thereof to prevent relative rotation between said snap ring and said recess to the extent that said split in said snap ring would not be visible in said recess.

2. A member having an opening therein, a shaft member received in said opening, a first circumferentially extending external groove in said shaft member and a second circumferentially extending internal groove in said opening registering with said external groove, a flexible, transversely split snap ring in said second groove and projecting partly into said first groove to prevent relative axial movement between said members, said snap ring being adapted to be flexed from said first groove farther into said second groove to permit disengagement of said members, an axially extending interior recess in one end of one of said members having identical portions of equal area and shape extending radially outwardly from the inner surface of said inner member in diametrically opposed relation extending partly thereacross to respectively expose the split in said snap ring and the radially opposite portion thereof to visual inspection proportioned to maintain the axial rotational balance of said member, portions of said snap ring extending radially into one portion of said recess and engageable with radially opposite walls thereof to prevent relative rotation between said snap ring and said recess to the extent that said split in said snap ring would not be visible in said recess.

3. A member having an opening therein, a shaft member received in said opening, a first circumferentially extending external groove in said shaft member and a second circumferentially extending internal groove in said opening registering with said external groove, a flexible, transversely split snap ring in said second groove and projecting partly into said first groove to prevent relative axial movement between said members, said snap ring being adapted to be flexed from said first groove farther into said second groove to permit disengagement of said members, an axially extending interior recess in said annular member exposing the split in said snap ring to visual inspection, portions of said snap ring extending radially outwardly into said recess and engageable with radially opposite walls thereof to prevent relative rotation between said snap ring and said recess to the extent that said split in said snap ring would not be visible in said recess.

4. In a universal joint of the type including inner and outer ball races and adapted to transmit rotary motion between shafts, an annular inner ball race member, a shaft member received in said inner ball race member, means preventing relative rotation between said shaft member and said inner ball race member, a first circumferentially extending groove in the inner surface of said inner ball race member, a second circumferentially extending groove in the surface of said shaft member located to align with said groove in the inner ball race member with said shaft member received within said inner ball race member, a flexible transversely split snap ring seated in said first groove and projecting into said second groove to prevent relative axial movement between said members, said snap ring being adapted to be flexed from said second groove entirely into said first groove to permit disengagement of said members, and an axial recess in an end of said inner ball race member spaced radially inwardly from the radially outer surface of the inner ball race member for exposing the split in said snap ring, portions of said snap ring extending radially into one portion of said recess and engageable with radially opposite walls thereof to prevent relative rotation between said snap ring and said recess to the extent that said split in said snap ring would not be visible in said recess.

5. In a universal joint of the type including inner and outer ball races and adapted to transmit rotary motion between shafts, an annular inner ball race member, a shaft member received in said inner ball race member, means preventing relative rotation between said shaft member and said inner ball race member, a first circumferentially extending groove in the inner surface of said inner ball race member, a second circumferentially extending groove in the surface of said shaft member located to align with said groove in the inner ball race member with said shaft member received within said inner ball race member, a flexible transversely split snap ring seated in said first groove and projecting into said second groove to prevent relative axial movement between said members, said snap ring being adapted to be flexed from said second groove entirely into said first groove to permit disengagement of said members, and an axial recess in an end of said inner ball race member spaced radially inwardly from the radially outer surface of the inner ball race member having identical portions of equal area and shape extending radially outwardly from the inner surface of said inner member in diametrically opposed relation adapted to expose respectively the split in said snap ring and the radially opposite portion thereof to visual inspection and to maintain the balance of said inner ball race member, end portions of said snap ring extending radially into one portion of said recess and engageable with radially opposite walls thereof to prevent relative rotation between said snap ring and said recess to the extent that said split in said snap ring would not be visible in said recess.

References Cited in the file of this patent

UNITED STATES PATENTS

| | | |
|---|---|---|
| 1,862,337 | Emrick | June 7, 1932 |
| 2,440,452 | Smith | Apr. 27, 1948 |
| 2,844,013 | Spence | July 22, 1958 |